Figure 1:
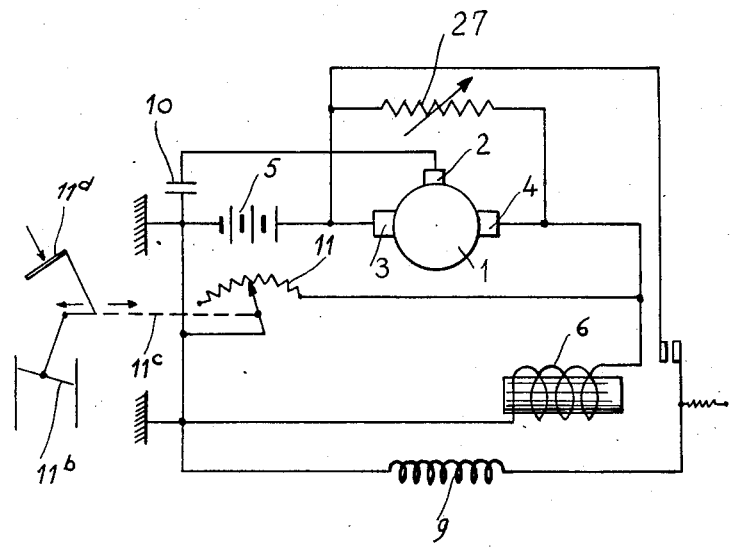

United States Patent Office 2,986,045
Patented May 30, 1961

2,986,045
AUTOMATIC GEAR CHANGE CONTROL DEVICES, NOTABLY FOR VEHICLES

Lucien Péras, Billancourt, France, assignor to Regie Nationale des Usines Renault, Billancourt, France Filed Mar. 2, 1959, Ser. No. 796,636

Claims priority, application France Mar. 7, 1958

4 Claims. (Cl. 74—472)

The present invention relates to a control arrangement for a power transmission system and is particularly concerned with an improvement in or modification of the control device disclosed in my co-pending applications Serial No. 500,976 (now Patent No. 2,927,474), filed April 12, 1955, Serial No. 599,971 (now Patent No. 2,910,884), filed July 25, 1956, and Serial No. 752,945, filed August 4, 1958.

In the aforesaid patent applications pulsating current is utilized of which the average value is proportional to the speed of rotation of a shaft driving a work load such as the wheels of a vehicle, this current being modulated as a function of the work load for operating relay means controlling the engagement or disengagement of the different gear ratios of the change-speed gear-box of the transmission system.

Now it is an object of this invention to provide an improved control device whereby it is possible to engage— when the vehicle is stationary—not only the lowest gear ratio as in the case of the hitherto described devices, but also the next higher ratio when the work load is relatively low, the lowermost ratio being engaged only when this work load exceeds a predetermined value.

As a matter of fact, it is frequently observed, in the operation of vehicle gearboxes, that the use of the lowest gear ratio is really necessary only when the conditions of operation of the vehicle are particularly difficult, for example when starting a fully-loaded vehicle up grade, whereas the next upper gear ratio would be quite sufficient for starting the vehicle under more normal conditions, provided that a great acceleration is not required. This fact is noticeable more particularly in the case of transmissions comprising, at least in the lower ratios, a torque converter giving an appreciable torque multiplication when starting from rest.

According to the present invention there is provided in a power transmission system for applying power from an engine to a work load variable from normal to heavy, the engine having a throttle operable to positions for increasing and decreasing the applied power delivered by said engine in accordance with said work load, and the system having a change-speed gear-box with a lowest and progressively higher gear ratios, and having electro-magnetic means connected in the system intermediate the engine and the work load and operable for sequentially changing gear ratios, and having a rotatable drive shaft connecting the gear box and the work load, and having a source of electrical direct current, an improved control device for controlling the operation of the electro-magnetic means to initiate gear changing with the next to lowest gear ratio with a normal work load, and with the lowest gear ratio with heavier work loads, the device comprising: a first electro-responsive means energizable from the direct current source for actuating said electro-magnetic means; commutating means electrically connected to said source of direct current and operable by the driven shaft and electrically connected to said direct current source for changing asid direct current into a pulsating electrical current the means value of which is proportional to the speed of rotation of the drive shaft; a second electro-responsive means having magnetic coil means energizable by said commutating means, and contact means connected between said direct current source and said first electro-responsive means and magnetically operable by said coil means from an open to a closed position, said coil means responsive to energization by the pulsating current of the commutating means to close said contact means thereby electrically connecting the direct current source with the first electro-responsive means to energize said electro-responsive means; first electrical means connected for energizing from the direct current source said second electro-responsive means through said first electro-responsive means independent of said commutating means and thereby closing said contacts to energize from said direct current source the first electro-responsive means to actuate the electro-magnetic means to change gear ratios from the lowest to the next to the lowest gear ratio when the drive shaft is motionless; and second electrical means, responsive to the operation of the throttle to a preselected position increasing the power delivered by said engine, for rendering ineffective the energization of the second electro-responsive means by the first electrical means, whereby the sequential changing of gear ratios is initiated with the next to the lowest gear ratio when the throttle is initially operated up to the preselected throttle positions as for normal work loads and from the lowest gear ratio when the throttle is initially operated at and beyond the preselected throttle position as for heavier work loads.

Figure 2:
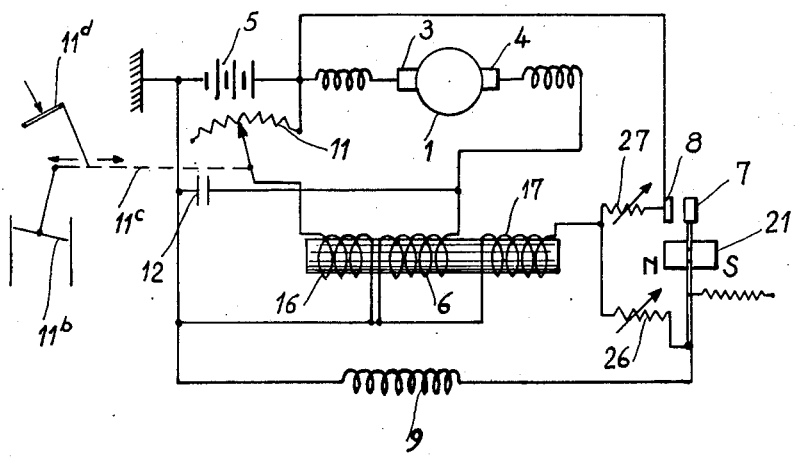
Figure 3:
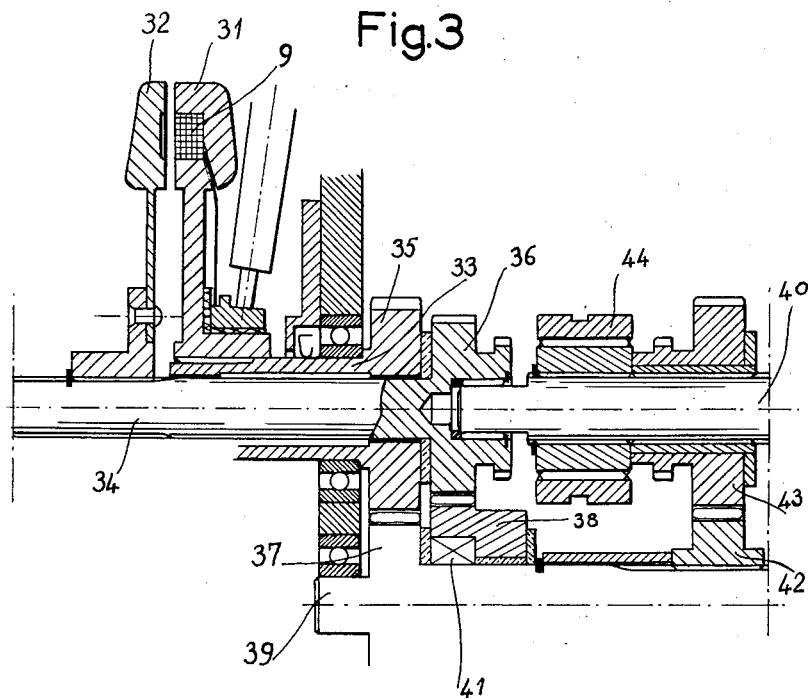
Figure 4:
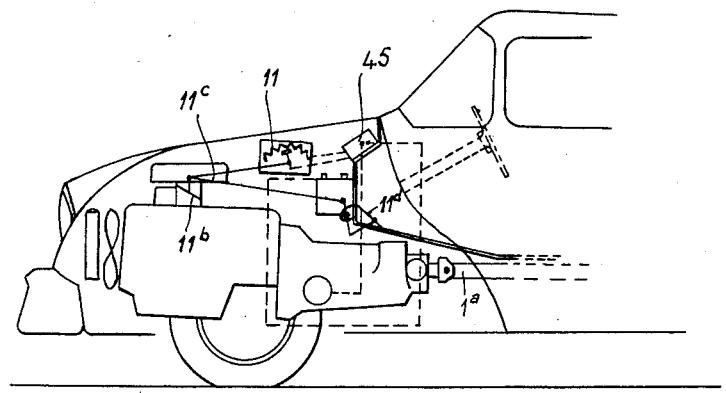

In order to afford a clearer understanding of this invention, reference will now be made to the accompanying diagrammatic drawings in which:

Figures 1 and 2 are circuit diagrams, the circuit of Fig. 1 being applicable to the assembly of devices disclosed in my aforesaid co-pending patent applications Serial Nos. 500,976, 599,971 and 752,945, and the circuit of Fig. 2 being a modification applicable to the specific case of the device shown in Fig. 1 of the drawings of my co-pending patent application Ser. No. 752,945, filed on August 4, 1958;

Figure 3 is an axial section, of a typical device for shifting from one gear ratio to another, and of transmission members responsive to this device; and Figure 4 is a diagrammatic elevational view showing the relative arrangement of the main common component elements of the circuits shown in Figures 1 and 2 on board an automobile.

In Figs. 1 and 2 it will be assumed that the relay 6 illustrated is that controlling the winding 9 corresponding to the electromagnetic engagement of the second gear ratio.

It may be reminded that in Fig. 1 the reference numeral 1 designates a commutating device for producing pulsating current of which the average value is a function of the speed of rotation of a shaft 1a driving the wheels of the vehicle. It comprises an input contact 3 and an output contact 4, the storage battery 5 of the vehicle being connected to contact 3 whereas the main winding 6 of a relay controlling the shifting from first to second gear is connected to contact 4.

An adjustable resistance 27 is connected in parallel across the commutating device 1.

Figure 2 is similar to Fig. 1 of the drawings of my co-pending patent application Ser. No. 752,945, filed August 4, 1958, except that a branch line comprising the adjustable resistor 27 is provided between the output terminal of battery 5 (or, in an equivalent manner, the fixed contact 8 of the relay) and the input terminal of the winding 17 of this relay.

The arrangement thus provided with the additional resistance 27 operates as follows:

In the case of Figure 1, the value of resistance 27 may be so selected that the current flowing through the main winding 6 of the relay is sufficient to cause the contacts of the latter to close and therefore cause engagement of the second gear ratio of the transmission when the vehicle is still and the rheostat 11 (operatively connected to the engine throttle 11b through a linkage 11c responsive to the accelerator pedal 11d) has a value corresponding to a load fraction of low or zero value, the operative connection between the engine throttle and the rheostat 11 being such that as the engine throttle is opened the resistance of rheostat 11 decreases. However, the resistance 27 must be high enough that, when the variable resistor 11 has a value corresponding to a substantial load fraction, that is, for a low value of resistor 11, there is effected by shunting the current, a decrease in the useful magnetic flux flowing through the relay core, sufficient to open the contacts of the relay controlling the second gear ratio.

In the case illustrated in Fig. 2, the current flows firstly through resistance 27 and then through winding 17 in order to close the relay contacts (assuming that the vehicle is stationary) when the position of rheostat 11 corresponds to a low or zero engine load, that is, to a high value of this resistor 11, the relay being released as in the preceding case when the position of rheostat 11 corresponds to a substantial engine load (and therefore to a low value of this resistance 11).

The consequence of either of these modifications on the operation of the vehicle is as follows:

When the engine load is zero (that is, with the engine idling) the transmission takes place through the second gear ratio instead of through the first or lowest ratio. As a result, if this transmission comprises a hydraulic coupling or a torque converter, the tendency of the vehicle to "creep along" under the influence of the residual torque transmitted through the coupling or the converter is reduced or eliminated.

As long as the engine load is zero or relatively low, the transmission takes place through this second gear, thus permitting a very smooth starting from rest and avoiding, as the vehicle picks up speed, any shifting from first gear to second gear.

If on the contrary the engine load is considerable, for example when the rheostat 11 is set on its minimum value (in the case of a full-power start) the transmission is shifted to the lowest gear and consequently the maximum tractive power is available for the start.

In order clearly to appreciate the part played by the winding 9 controlling the second gear ratio, Fig. 3 illustrates this winding together with the gearbox members associated therewith.

This winding is incorporated in a plate system 31, 32 of an electromagnetic clutch and adapted, when energized, to drive the shaft 33, on which plate 31 is keyed, from the input shaft 34 on which plate 32 is keyed. This causes pinions 35 and 36 carried by shafts 33 and 34 respectively to rotate bodily and thus shaft 39 carrying pinions 37 and 38 will also rotate, but as the pinion 38 is mounted on a freewheel device 41, it will remain disconnected and the output shaft 40 will be driven by the input shaft 34 through the train of gears 35, 37, 42, and 43. On the other hand, when winding 9 is de-energized, pinion 35 and its shaft 33 rotate freely on the input shaft 34 and the drive takes place through pinions 36 and 38 and gears 42 and 43, thus providing the lowest ratio. A direct-drive transmission is obtained by means of the sliding hub 44 when the latter is moved to a position in which it ensures a direct coupling between shafts 34 and 40.

Figures 4 illustrates diagrammatically the manner in which the main common component elements of the circuits shown in Figures 1 and 2 may be arranged on board a vehicle, the shaft 1a being the output shaft of the gearbox; the relay and its contacts is mounted in a case 45 under the bonnet, the rheostat 11 being actuated through a linkage 11c responsive to the accelerator pedal 11d together with the engine throttle 11b.

I claim:
1. In a power transmission system for applying power from an engine to a work load variable from normal to heavy, the engine having a throttle operable to positions for increasing and decreasing the applied power delivered by said engine in accordance with said work load, and the system having a change-speed gear-box with a lowest and progressively higher gear ratios, and having electromagnetic means connected in the system intermediate the engine and the work load and operable for sequentially changing gear ratios, and having a rotatable drive shaft connecting the gear box and the work load, and having a source of electrical direct current, an improved control device for controlling the operation of the electro-magnetic means to initiate gear changing with the next to lowest gear ratio with a normal work load, and with the lowest gear ratio with heavier work loads, the device comprising: a first electro-responsive means energizable from the direct current source for actuating said electro-magnetic means; commutating means electrically connected to said source of direct current and operable by the driven shaft and electrically connected to said direct current source for changing said direct current into a pulsating electrical current the mean value of which is proportional to the speed of rotation of the drive shaft; a second electro-responsive means having magnetic coil means energizable by said commutating means, and contact means connected between said direct current source and said first electro-responsive means and magnetically operable by said coil means from an open to a closed position, said coil means responsive to energization by the pulsating current of the commutating means to close said contact means thereby electrically connecting the direct current source with the first electro-responsive means to energize said electro-responsive means; first electrical means connected for energizing from the direct current source said second electro-responsive means through said first electrical means independent of said commutating means and thereby closing said contacts to energize from said direct current source the first electro-responsive means to actuate the electro-magnetic means to change gear ratios from the lowest to the next to the lowest gear ratio when the drive shaft is motionless; and second electrical means, responsive to the operation of the throttle to a preselected position increasing the power delivered by said engine, for rendering ineffective the energization of the second electro-responsive means by the first electrical means, whereby the sequential changing of gear ratios is initiated with the next to the lowest gear ratio when the throttle is initially operated up to the preselected throttle positions as for normal work loads and from the lowest gear ratio when the throttle is initially operated at and beyond the preselected throttle position as for heavier work loads.

2. An improved control device as described in claim 1 characterized in that said first electrical means comprises an adjustable resistor connecting said direct current source to said second electro-responsive means in parallel with said commutating means.

3. An improved control device as described in claim 1 characterized in that said second electrical means comprises a variable resistor connected across the source of said direct current and parallel to said second electro-responsive means, said variable resistor having an operating arm operably connected to said throttle to decrease the resistance of said parallel connection when the said throttle is operated to positions for increasing said power delivered by said engine.

4. In a power transmission system for applying power from an engine to a work load variable from normal to heavy the engine having a throttle operable to positions for increasing and decreasing the applied power delivered by said engine in accordance with the work load, and the system having a change-speed gear-box with a lowest and progressively higher gear ratios, and having electro-magnetic means connected in the system intermediate the engine and the work load and operable for sequentially changing gear ratios, and having a rotatable drive shaft connecting the gear box and the work load, and having an electrical source of direct current, an improved control device for controlling the operation of the electro-magnetic means to initiate gear changing with the next to lowest gear ration with a normal work load, and with the lowest gear ration with heavier work loads, the device comprising; a first electro-responsive means energizable by the source of direct current for actuating said electro-magnetic means; commutating means operable by the driven shaft and electrically connected to said source of direct current for changing said direct current into a pulsating current, the mean value of which is proportional to the speed of rotation of the drive shaft; a second electro-responsive means having a plurality of magnetic coils, the first and second coils being oppositely wound and energizable in parallel by said source of direct current, and a third coil intermediate said first and second coils and energizable by said commutating means, and said second electro-responsive means having a pair of contacts, one said contact being electrically connected to said source of direct current and the second contact electrically connected to said first electro-responsive means, said contacts being magnetically operable from a biased open to a closed position by said first coil when energized by said sources of direct current, a pair of variable resistors connected in series across said contacts, one said variable resistor being connected in series with said first coil and said variable resistors being connected in series with said first coil and said variable resistors being cooperatively adjusted to energize said first coil by said source of direct current to close said contacts thereby energizing said first electro-responsive means to actuate the electro-magnetic means to change gear ratios from the lowest to the next to lowest gear ratio when the drive shaft is motionless; a third variable resistor connected in series with said second coil and having an operating arm connected to the throttle to decrease the resistance of said third variable resistor as said throttle is operated to a position for increasing power delivered by said engine to approximately equal the resistance of said first variable resistor, thereby equalizing the energization of said oppositely wound first and second coils by said source of direct current to magnetically neutralize said coils to open said contacts and deenergize the first electro-responsive means to actuate the electro-magnetic means to change rear ratios from the next to lowest gear ratio back to the lowest gear ratio; and said contacts being magnetically operable to a closed position by said third coil when energized by said commutating means to energize said first electro-responsive means to actuate said electro-magnetic means to sequentially change gears from the lowest ratio gear ratio to the highest; whereby changing gear ratios is initiated in the next to lowest gear when said first coil is energized, and in the lowest gear ratio when the energization of the first coil is magnetically neutralized by the equal energization of said second coil by means of the operation of the throttle to a position for increasing the engine power.

References Cited in the file of this patent

UNITED STATES PATENTS

| | | |
|---|---|---|
| 2,657,587 | Volk et al. | Nov. 3, 1953 |
| 2,855,794 | Faisandier | Oct. 14, 1958 |
| 2,881,625 | Hodkin | Apr. 14, 1959 |